(12) United States Patent
Patnode et al.

(10) Patent No.: US 10,889,947 B2
(45) Date of Patent: Jan. 12, 2021

(54) THERMOPLASTIC PAVEMENT MARKING TAPES

(71) Applicant: 3M INNOVATIVE PROPERTIES COMPANY, St. Paul, MN (US)

(72) Inventors: Gregg A. Patnode, Woodbury, MN (US); James P. Endle, New Richmond, WI (US); Eugene H. Carlson, Apple Valley, MN (US); Matthew D. Wilding, White Bear Lake, MN (US); Stephen L. Lieder, Wyoming, MN (US)

( * ) Notice: Subject to any disclaimer, the term of this patent is extended or adjusted under 35 U.S.C. 154(b) by 392 days.

(21) Appl. No.: 15/736,980

(22) PCT Filed: Jun. 16, 2016

(86) PCT No.: PCT/US2016/037743
§ 371 (c)(1),
(2) Date: Dec. 15, 2017

(87) PCT Pub. No.: WO2016/205443
PCT Pub. Date: Dec. 22, 2016

(65) Prior Publication Data
US 2018/0371713 A1    Dec. 27, 2018

Related U.S. Application Data

(60) Provisional application No. 62/181,280, filed on Jun. 18, 2015.

(51) Int. Cl.
*C09D 1/00*        (2006.01)
*E01F 9/512*       (2016.01)
(Continued)

(52) U.S. Cl.
CPC ............... *E01F 9/512* (2016.02); *B32B 7/12* (2013.01); *B32B 25/042* (2013.01); *B32B 25/06* (2013.01);
(Continued)

(58) Field of Classification Search
USPC ........................................ 106/31.01, 31.04
See application file for complete search history.

(56) References Cited

U.S. PATENT DOCUMENTS

| | | |
|---|---|---|
| 3,043,196 A | 7/1962 | Palmquist |
| 3,171,827 A | 3/1965 | De Vries |
| (Continued) | | |

FOREIGN PATENT DOCUMENTS

| | | |
|---|---|---|
| CA | 2388405 | 6/1992 |
| CA | 2237358 | 10/1996 |
| (Continued) | | |

OTHER PUBLICATIONS

International Search Report for PCT International Application No. PCT/US2016/037743, dated Aug. 31, 2016, 3 pages.
(Continued)

*Primary Examiner* — James E McDonough

(57) ABSTRACT

The present disclosure generally relates to non-conformable thermoplastic pavement marking tapes comprising a backing and an adhesive layer adjacent to the backing. In some embodiments, the backing includes an ionic copolymer. In other embodiments, the non-conformable backing has an inelastic deformation of less than 10% at 25° C. In some embodiments, the pavement marking tape is heat-moldable.

14 Claims, 1 Drawing Sheet

(51) Int. Cl.

| | | |
|---|---|---|
| C09D 4/00 | (2006.01) | |
| C09D 5/00 | (2006.01) | |
| C09D 11/00 | (2014.01) | |
| C09K 3/00 | (2006.01) | |
| B32B 7/12 | (2006.01) | |
| B32B 25/04 | (2006.01) | |
| B32B 25/06 | (2006.01) | |
| B32B 25/08 | (2006.01) | |
| B32B 27/08 | (2006.01) | |
| B32B 27/10 | (2006.01) | |
| B32B 27/22 | (2006.01) | |

(52) U.S. Cl.
CPC ............ *B32B 25/08* (2013.01); *B32B 27/08* (2013.01); *B32B 27/10* (2013.01); *B32B 27/22* (2013.01); *B32B 2264/10* (2013.01); *B32B 2264/101* (2013.01); *B32B 2264/102* (2013.01); *B32B 2264/104* (2013.01); *B32B 2270/00* (2013.01); *B32B 2274/00* (2013.01); *B32B 2307/40* (2013.01); *B32B 2307/416* (2013.01); *B32B 2307/554* (2013.01); *B32B 2307/748* (2013.01); *B32B 2405/00* (2013.01)

(56) References Cited

U.S. PATENT DOCUMENTS

| | | |
|---|---|---|
| 3,279,336 A | 10/1966 | Eaton |
| 3,393,615 A | 7/1968 | Micheln |
| 3,556,637 A | 1/1971 | Palmquist |
| 3,874,801 A | 4/1975 | White |
| 3,935,365 A * | 1/1976 | Eigenmann ............ G02B 5/128 428/323 |
| 4,059,715 A | 11/1977 | Pletcher |
| 4,117,192 A | 9/1978 | Jorgensen |
| 4,173,506 A | 11/1979 | Pletcher |
| 4,248,932 A | 2/1981 | Tung |
| 4,388,359 A | 6/1983 | Ethen |
| 4,490,432 A | 12/1984 | Jordan |
| 4,564,556 A | 1/1986 | Lange |
| 4,681,401 A | 7/1987 | Wyckoff |
| 4,758,469 A | 7/1988 | Lange |
| 4,955,541 A | 9/1990 | Carteron |
| 4,969,713 A | 11/1990 | Wyckoff |
| 4,988,541 A | 1/1991 | Hedblom |
| 4,988,555 A | 1/1991 | Hedblom |
| 5,087,148 A | 2/1992 | Wyckoff |
| 5,108,218 A | 4/1992 | Wyckoff |
| 5,139,590 A | 8/1992 | Wyckoff |
| 5,194,113 A | 3/1993 | Lasch |
| 5,296,547 A | 3/1994 | Nestegard |
| 5,527,853 A | 6/1996 | Landy |
| 5,536,569 A | 7/1996 | Lasch |
| 5,539,033 A | 7/1996 | Bredahl |
| 5,557,461 A | 9/1996 | Wyckoff |
| 5,563,569 A | 10/1996 | Pellegrino |
| 5,643,655 A | 7/1997 | Passarino |
| 5,773,506 A | 6/1998 | Nestegard |
| RE36,042 E | 1/1999 | Landy |
| 5,942,280 A | 8/1999 | Mathers |
| 5,981,033 A | 11/1999 | Haunschild |
| 6,024,824 A | 2/2000 | Krech |
| 6,217,252 B1 | 4/2001 | Tolliver |
| 6,245,700 B1 | 6/2001 | Budd |
| 6,258,201 B1 | 7/2001 | Krech |
| 6,468,678 B1 * | 10/2002 | Dahlin ............ E01F 9/30 180/167 |
| 6,511,739 B2 | 1/2003 | Kasai |
| 7,168,815 B2 | 1/2007 | Shipman |
| 7,513,941 B2 | 4/2009 | Frey |
| 7,524,779 B2 | 4/2009 | Frey |
| 8,247,054 B2 | 8/2012 | Greer |
| 9,234,322 B2 | 1/2016 | Greer |
| 9,340,934 B2 | 5/2016 | Carlson |
| 9,732,481 B2 | 8/2017 | Greer |
| 2002/0168534 A1 | 11/2002 | Hermes |
| 2003/0051807 A1 | 3/2003 | Yamaguchi |
| 2003/0070579 A1 | 4/2003 | Hong |
| 2005/0079324 A1 * | 4/2005 | Haunschild ............ E01F 9/524 428/143 |
| 2011/0123769 A1 * | 5/2011 | Greer ............ G09F 7/12 428/143 |
| 2011/0123770 A1 * | 5/2011 | Greer ............ E01F 9/512 428/143 |
| 2014/0193576 A1 | 7/2014 | Carlson |

FOREIGN PATENT DOCUMENTS

| | | |
|---|---|---|
| CN | 1195729 | 10/1998 |
| CN | 1074486 | 11/2001 |
| CN | 1167185 | 9/2004 |
| EP | 0 936 212 | 2/1999 |
| JP | 4525243 | 8/2010 |
| WO | WO 93/11303 | 6/1993 |
| WO | WO 98/40562 | 9/1998 |
| WO | WO 2000-09811 | 2/2000 |
| WO | WO 2005/038144 | 4/2005 |
| WO | WO 2005/073468 | 8/2005 |
| WO | WO 2007-092635 | 8/2007 |
| WO | WO 2013/033302 | 3/2013 |
| WO | WO 2015-123625 | 8/2015 |

OTHER PUBLICATIONS

Kar, et al., "Ionomeric Thermoplastic Elastomers," Chapter 16, pp. 433-477, ISBN: 0-8247-0383-9; http://www.dekker.com; © 2001 by Marcel Dekker, Inc.

\* cited by examiner

THERMOPLASTIC PAVEMENT MARKING TAPES

CROSS REFERENCE TO RELATED APPLICATIONS

This application claims priority to U.S. Provisional Patent Application No. 62/181,280, filed Jun. 18, 2015, the disclosure of which is incorporated by reference in its entirety herein.

TECHNICAL FIELD

The present disclosure generally relates to thermoplastic pavement marking tapes and to methods of making and applying these pavement marking tapes.

BACKGROUND

Pavement or road markings (e.g., paints, tapes, and individually mounted articles) guide and direct motorists and pedestrians traveling along roadways and paths. Pavement or road markings can be used on, for example, roads, highways, parking lots, and recreational trails. Typically, pavement markings form stripes, bars, and markings for the delineation of lanes, crosswalks, parking spaces, symbols, legends, and the like. Paint was a preferred pavement marking for many years. However, modern pavement marking materials offer significant advantages over paint, such as increased visibility, retroreflectance, improved durability, and temporary and/or removable marking options. Currently available road marking materials can be, for example, sheets, films, tapes, sprayable compositions, and raised pavement markers.

Pavement or road markings are subject to continuous wear and exposure to the elements as well as road chemicals. Consequently, there is a need for pavement or road marking compositions and materials that provide durability and retained reflectivity once applied to a surface and, optionally, dried and/or hardened. Some deficiencies associated with known pavement marking tapes include (1) conformance difficulties; (2) limited temperature ranges for application to a highway surface; (3) environmental and health concerns associated with the production of solvent-based marking tapes; (4) high production cost; and (5) inadequate mechanical properties (e.g., tensile strength) for removability and/or wearability.

Thermoplastic polymers are often included in road markings because they are highly durable. Additionally, the use of thermoplastic polymers in road markings results in shorter track-free time. "Track-free time," as used herein, is the time between application and the point where material will no longer transfer to vehicle tires or deform. Shorter track-free times increase marking efficiency by reducing or eliminating the need for traffic disruption through such measures as closing lanes or placing traffic control devices to protect such markings.

Pavement marking that exhibit good conformability to a substrate typically include at least one conformance layer, such as described in, for example, U.S. Pat. No. 5,194,113 (Lasch et al). The pavement marking of Lasch et al includes a conformance layer which is from about 75 to about 1250 micrometers thick, and includes a ductile thermoplastic polymer. By ductile, it is meant that the material is deformable to about 115% of its original length (i.e., 15% strain) at a strain rate of 0.05 sec$^{-1}$ (300% per minute) and not more than 25 pound force per inch width without breaking. In addition, at least 10% of the strain is maintained after the deforming force is removed.

Another exemplary conformable pavement marking composition is described in U.S. Pat. No. 5,981,033 (Haunschild et al) which describes a pavement marking tape including a conformable layer and further comprising a scrim, wherein the scrim is extensible to enable the tape to conform to irregularities in a road surface, and thereby bond more securely to the road surface.

SUMMARY

In one aspect, the present inventors sought to develop pavement marking tapes that exhibit adequate adhesion to a substrate when applied thereon without the use of a conformance layer. In another aspect, the present inventors sought to develop a durable non-conformable and heat-moldable pavement marking tape.

The present inventors developed a pavement marking tape that molds to and has adequate adhesion to a substrate to which it is applied even though its backing comprises a non-conformable polymer. In some embodiments, the substrate is irregular.

The pavement marking tapes described herein have numerous advantages. One exemplary advantage is that the present pavement marking tapes are thinner than conventional pavement marking tapes. Another exemplary advantage of the pavement marking tapes described herein is that it comprises non-conformable and non-wearable backing materials which render the tape durable even in difficult environments such as high traffic intersections. Yet another exemplary advantage relates to the ability to heat-mold the pavement marking tape for improved contact with the substrate.

The pavement marking tapes of the present application comprise a non-conformable backing and an adhesive layer. In some embodiments the adhesive layer comprises a hot-melt adhesive. In such embodiments, the adhesive is heated prior to application of the tape to a substrate thereby allowing adhesive flow and improved wetting of the substrate.

Another exemplary advantage is that at least some of the pavement marking tapes are equally or more durable than existing pavement marking tapes. In embodiments where durability is improved, thinner pavement marking tapes can be formed Thinner pavement markers can cover the same area using less material, and may thus be more cost-effective to manufacture and apply. Alternatively, preformed pavement markers of traditional thickness can be made and, due to the increased durability, these will last longer, resulting in fewer lane closures due to pavement marking application.

In one aspect, the present application relates to a heat-moldable and non-conformable pavement marking tape comprising a backing including an ionic copolymer and having a first major surface and an opposite second major surface, and an adhesive layer adjacent to the second major surface of the backing. In some embodiments, the backing has a thickness of at least 300 microns. In some embodiments, the adhesive layer is directly adjacent to the backing.

In another aspect, the present application relates to a thermoplastic pavement marking tape comprising a non-conformable backing having an inelastic deformation of less than 10% at 25° C., and an adhesive layer directly adjacent the non-conformable backing. In some embodiments, the non-conformable backing comprises an ionic copolymer.

In some embodiments the present pavement marking tape further comprises at least one of optical elements and skid-resistant particles. In some embodiments, the optical elements are selected from the group consisting essentially of glass beads, transparent microspheres, aggregates and bonded core elements.

In some embodiments, the backing of the present pavement marking tape has a melt flow index between 0.7 g/10 min and 20 g/10 min.

DETAILED DESCRIPTION

Figure 1:
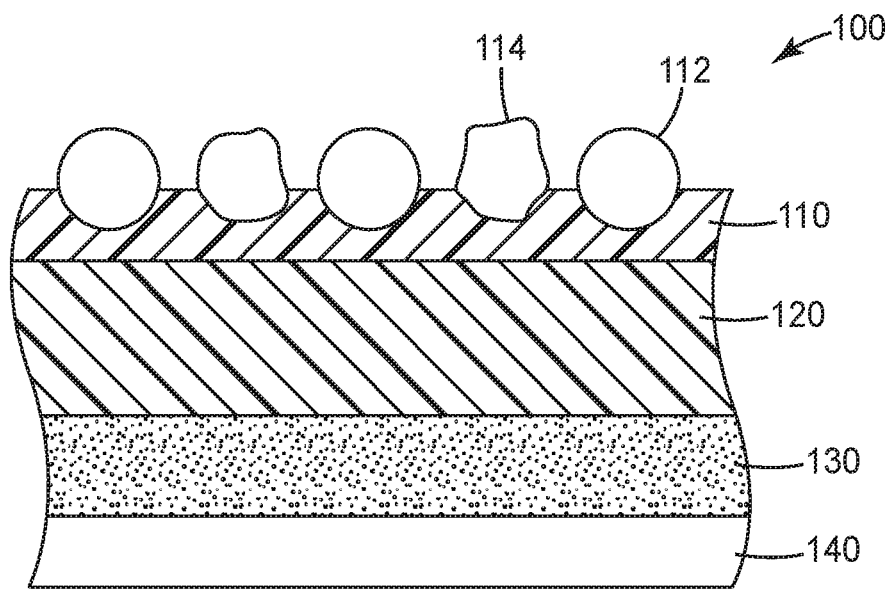
FIG. 1 illustrates a cross-section of a conformable pavement marking tape of the prior art

Exemplary thermoplastic pavement marking tapes of the present disclosure are heat-moldable and non-conformable. The present pavement marking tapes include a non-conformable backing having a first major surface (i.e., front surface) and a second major surface (i.e., back surface), and an adhesive layer adjacent to the second major surface of the non-conformable backing. In some embodiments, the adhesive layer is directly adjacent the non-conformable backing. In some embodiments, the non-conformable backing includes an ionic copolymer. In some embodiments, the non-conformable backing has an inelastic deformation of less than 10% at 25° C.

The term "conformable" as used herein refers to a pavement marking tape that will stretch and bend sufficiently during application at ambient temperatures with a reasonable force to bring the adhesive layer of the pavement marking tape into complete contact with the rough texture of a substrate to promote formation of a good bond. By "reasonable forces" it is meant that after application of the pavement marking tape to the substrate and rolling over the applied tape with a typical tamping means the marking tape conforms to the road surface. A tamping cart with a load of about 200 lbs (90 kg) is typically employed in the application of marking tapes. A conformable pavement marking tape must have an inelastic deformation greater than 10% and be deformable to about 115% of its original length (i.e., 15% strain) at a strain rate of 0.05 sec-1 (300% per minute) with not more than 20 pound force per inch width, and wherein at least 10% of the strain is maintained after the deforming force is removed.

The term "non-conformable" as used herein refers to a substrate that has an inelastic deformation of less than 10% or is not deformable to about 115% of its original length (i.e., 15% strain) at a strain rate of 0.05 sec-1 (300% per minute).

The term "heat-moldable" as used herein refers to a pavement marking tape that becomes pliable or moldable above a temperature of at least 71° C. (160° F.), thereby taking the shape of the profile of the substrate to which the pavement marking tape is applied. The heat-moldable pavement marking tape then cools down and solidifies in the new shape.

The term "elastic recovery" as used herein refers to the tendency of a pavement marking tape to return to its original shape after being deformed.

The term "inelastic deformation" as used herein refers to the amount of deformation remaining in a pavement marking tape after it has been deformed and undergone elastic recovery. Inelastic deformation is defined by the following test: (1) a test strip (standard strip size for tensile strength testing) is pulled (i.e., deformed or strained) in a tensile strength apparatus (at, for example a strain rate of 0.05 per second which also may be expressed as 300% per minute) until it is strained some predetermined distance, e.g. 115% of original sample length; (2) the pull is reversed and the machine returned to its starting point causing a complete release of the tensile stress in the sample; (3) on repeated tensile deformation, no force is observed until the sample is again taut; (4) the strain at which a resisting force is first observed on the second pull (i.e. when the sample again becomes taut) is observed. The strain at which resistance is first observed on the second pull, divided by the first strain is defined as inelastic deformation (ID). A perfectly elastic material would have 0% ID. Conformable materials combined desirably low force to deform and ID greater than 10%.

The term "thermoplastic" as used herein is used to mean a polymeric or wax material that has the property of softening or melting and becoming pliable or moldable when heated, and the property of hardening and becoming rigid when cooled.

The term "directly adjacent" as used herein means that there are no intervening elements present between two layers that are directly adjacent to each other.

Conventional thermoplastic pavement marking tapes are conformable and may employ a conformant or conformance layer to increase conformability to the substrate. To maximize conformability, materials used in the conformant layer are typically characterized by very low crystallinity and low tensile strength, as described in, for example, U.S. Pat. No. 5,194,113 to Lasch et al, the disclosure of which is incorporated herein by reference in its entirety. Lasch et al describes that a conformant layer is needed to enable the adhesive to fully make contact with the underlying substrate, i.e. the road. In addition, suitable polymers for the conformant layer of Lasch et al are polymers with higher melt indices. Particularly, Lasch et al describes that polymers with lower melt indices are too viscous for particle embedding.

Application of conventional conformable pavement marking tapes is typically carried out at room temperature using conventional tape applicators.

In contrast, the present inventors developed a thermoplastic pavement marking tape comprising a non-conformable backing that is adjacent to an adhesive layer. Surprisingly, even though the pavement marking tape was rendered non-conformable due to the non-conformable backing, the pavement marking tape was heat-moldable and the adhesive still made adequate contact with the underlying substrate.

In one aspect, the present application relates to a method of applying a non-conformable pavement marking tape comprising a non-conformable backing to a substrate, followed by subsequent application of heat to the pavement marking tape above the melting temperature of the non-conformable backing. At temperatures above the melting temperature of the non-conformable backing, the backing undergoes molecular rearrangement and molds to the substrate.

Typically, conventional pavement marking tapes are multilayered products with three or more layers. In some embodiments, the present inventors sought to develop a pavement marking tape that only has two layers: a backing and an adhesive layer adjacent to the backing. Because fewer layers are used, the overall tape construction is thinner than conventional tapes.

In some embodiments, the present pavement marking tape includes a backing comprising an ionic copolymer. The term "ionic copolymer" as used herein refers to materials that include a fraction of ionized units (usually no more than 15 mole percent) covalently bonded to a polymer backbone as pendant group moieties. Some exemplary ionic copolymers include those commercially available under the trade designation SURLYN by DuPont de Nemours. In some embodiments, the ionic copolymer is an ionically cross-linked ethylene methacrylic acid copolymer.

Ionic copolymers are usually too elastic, hard to process (due to their low melt flow index), tougher and less conformable than conventional thermoplastic polymers used in pavement marking tapes. Melt flow index of suitable ionic copolymers ranges between 0.7 g/10 min and 20 g/10 min.

FIG. 1 illustrates a cross-section of a pavement marking tape of the prior art. The pavement marking tape 100 includes a top or visible layer 110 with partially embedded glass microspheres 112 and skid-resistant particles 114, a base or conformance layer 120, a pressure sensitive adhesive layer 130 and a release liner 140. Typically the thicknesses of these layers range from about 20 to about 180 micrometers for the top layer 110; from about 200 to about 600 micrometers for the conformance layer 120; and from about 80 to about 200 micrometers for the adhesive layer 130.

Figure 2:
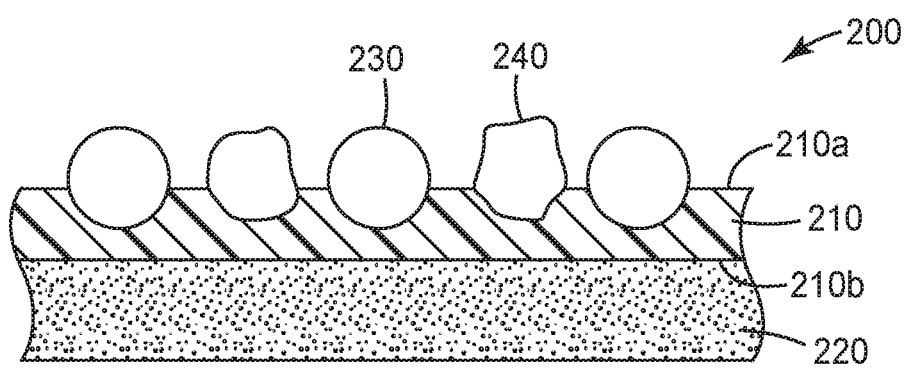
FIG. 2 illustrates a cross-section of an exemplary embodiment of a pavement marking tape according to the present application.

FIG. 2 illustrates a cross-section of an exemplary embodiment of a pavement marking tape according to the present application. The pavement marking tape 200 comprises a backing 210 having a first major surface 210a and a second major surface 210b. An adhesive layer 220 is adjacent to the second major surface 210b of the backing 210.

In some embodiments, the adhesive layer 220 is directly adjacent to the backing. By "directly adjacent" it is meant that there is no additional substrate layer between backing 210 and adhesive layer 220. The term "substrate layer" as used herein means a layer that is at least 5 micron thick.

In some embodiments, a thin layer (not shown) may be present between backing 210 and adhesive layer 220, such as, for example, an adhesion promoting layer and a primer layer. These layers would typically be less than 250 micron thick.

In some embodiments, the backing 210 includes an ionic copolymer and has a thickness greater than about 300 microns (12 mil). In some embodiments, the thickness is between 300 (12 mil) and 900 microns (36 mil). Preferably, the non-conformable backing has a thickness between about 330 microns and about 610 microns (13 mil and 24 mil).

In some embodiments, the backing further comprises other ingredients such as fillers, extender resins and pigments. In some embodiments, the backing includes titanium dioxide as a filler. In some embodiments, the backing comprises between 5 and 85 weight percent of filler based on the total weight of polymer in the backing. In some embodiments, the backing comprises between 5 and 30 weight percent of filler based on the total weight of polymer in the backing. In some embodiments, the backing comprises between about 15 and 50 weight percent of a non-reinforcing filler based on the total polymer weight of the backing.

The adhesive layer 220 is typically between 381 microns and 508 microns thick (15 mil and 20 mil).

Conventional pavement marking tapes have an overall thickness of between 75 mils and 100 mils (1905 microns and 2540 microns) (not including reflective elements and/or abrasive particles). In contrast, the pavement marking tape of the present application has an overall thickness (not including reflective elements and/or abrasive particles) of between 681 microns and 1200 microns (27 mil and 47 mil).

In addition to the ionic copolymer, the backing of the pavement marking tapes of the present disclosure may also include, for example, other thermoplastic polymers. Suitable thermoplastic polymers include ethylene acrylic acid (EAA) copolymers, ethylene methacrylic acid (EMAA) copolymers, propylene-ethylene copolymers, polypropylene (PP), ethylene-propylene-diene terpolymers (EPDM), polybutylene, ethylene n-butyl acrylate (EnBA), ethylene vinyl acetate (EVA), ethylene ethyl acrylate (EEA) copolymer, ethylene ethyl methyl acrylate (EMA), and blends thereof.

The pavement marking tape 200 may optionally include optical elements 230 and/or abrasive (i.e., skid-resistant) particles 240. In some embodiments, the presence of optical elements (e.g., retroreflective or reflective) increase visibility or signaling performance of the pavement marking tape. Exemplary optical elements include, but are not limited to, transparent microspheres and cube-corner particles derived from ground sheeting. Exemplary optical elements include transparent microspheres having a refractive index of between about 1.4 and about 2.26. Suitable microspheres include those described in U.S. Pat. No. 6,245,700 (Budd et al), U.S. Pat. No. 6,511,739 (Kasai et al), U.S. Pat. No. 7,524,779 (Frey et al) and U.S. Pat. No. 7,513,941 (Frey et al), all of which are incorporated herein by reference in their entirety. Exemplary optical elements include glass beads, such as those described in U.S. Pat. No. 4,564,556 (Lange) and U.S. Pat. No. 4,758,469 (Lange), both of which are incorporated herein by reference. These glass beads are generally described as solid, transparent, non-vitreous, ceramic spheroids having at least one metal oxide phase.

Other exemplary optical elements for use in the pavement marking tapes of the present application include aggregates (e.g., a polymer matrix with transparent spheres and/or bonded core elements dispersed therein) and bonded core elements (e.g., materials having a core and a plurality of transparent spheres adhered to the core) such as, for example, those described in U.S. Pat. No. 5,942,280 (Mathers et al), U.S. Pat. No. 3,043,196 (Palmquist et al), U.S. Pat. No. 3,556,637 (Palmquist), and U.S. Pat. No. 3,171,827 (de Vries et al), all of which are incorporated herein by reference. These aggregates and/or bonded core elements typically have a refractive index between about 1.5 and about 2.4.

Without wishing to be bound by theory, it is believed that the ionic copolymer of the present pavement marking tape forms an ionic bond to glass beads and elements, thereby increasing adhesion of these optical elements to the backing and increasing durability of the pavement marking tape.

The optical elements and/or skid-resistant particles may have any desired shape. Optical elements are preferably spheroidal. Methods of applying the optical elements and/or skid-resistant particles to pavement marking tapes are disclosed in, for example, U.S. Pat. No. 4,955,541 (Hedblom), the disclosure of which is incorporated herein by reference in its entirety. In some embodiments, the optical elements and/or skid-resistant particles are included at a concentration of up to about 60 wt % based on the total weight of the pavement marking tape. In some embodiments, they are included in a concentration of about 18 wt % to about 50 wt %.

In some embodiments, the retroreflective or reflective elements and/or skid-resistant particles may be dispersed on or throughout the thickness of the backing. Alternatively, or in addition to, the retroreflective elements may be disposed on the first major surface 210a of the backing 210. When disposed on the first major surface of the backing, said elements and/or particles are partially embedded in the backing and partially protruding from the backing, to provide immediate reflectivity and skid-resistance. Other particles may also be embedded in the backing to become exposed as the pavement marking tape is worn away. The elements and/or particles may be held in the partially protruding position by use of a support film adhered to the sheet material of the invention, for example, as taught in column 4 of U.S. Pat. No. 4,988,541.

Suitable skid-resistant particles include aluminum oxide, glass frit, and sand.

In some embodiments, the backing further includes a stabilizing agent that assists in providing UV or heat resistance. Exemplary stabilizing agents include, for example, hindered amine light stabilizers (HALS), phosphonate heat stabilizers, benzophenones, and zinc compounds. Stabilizing agents may be present at levels up to about 5 wt %. Some embodiments include a rheology control agent that assists in providing settling resistance. Exemplary rheology control agents include, for example, bentone and fumed silica. Some embodiments include one or more plasticizers. In some embodiments, extender resins, often halogenated polymers such as chlorinated paraffins, but also hydrocarbon resins or polystyrenes, are preferably included with the non-cross-linked elastomer precursor ingredients, and are miscible with, or form a single phase with, the elastomer precursor ingredients.

In some embodiments, the ionic copolymer and optional ingredients are mixed to form a relatively homogeneous mixture, wherein fillers and other materials insoluble in the ionic copolymer are dispersed randomly three-dimensionally throughout the ionic copolymer. An extruder is suitable for this purpose.

The pavement marking tape of the present disclosure can be any desired color, including, for example, white or yellow. The pavement marking tape can be colored in any way known in the art, including, for example, inclusion of one or more of organic pigments, inorganic pigments and whitening agents.

Examples of useful organic pigments include halogenated copper phthalocyanines, aniline Blacks, anthraquinone blacks, benzimidazolones, azo condensations, arylamides, diarylides, disazo condensations, isoindolinones, isoindolines, quinophthalones, anthrapyrimidines, flavanthrones, pyrazolone oranges, perinone oranges, beta-naphthols, BON arylamides, quinacridones, perylenes, anthraquinones, dibromanthrones, pyranthrones, diketopyrrolo-pyrrole pigments (DPP), dioxazine violets, copper and copper-free phthalocyanines, Indanthrones, and the like.

Examples of useful inorganic pigments include titanium dioxide, zinc oxide, zinc sulphide, lithopone, antimony oxide, barium sulfate, carbon black, graphite, black iron oxide, black micaceous iron oxide, brown iron oxides, metal complex browns, lead chromate, cadmium yellow, yellow oxides, bismuth vanadate, lead molybdate, cadmium red, red iron oxide, prussian blue, ultramarine, cobalt blue, chrome green (Brunswick green), chromium oxide, hydrated chromium oxide, organic metal complexes, laked dye pigments and the like.

Exemplary whitening agents include, for example, $TiO_2$, barium sulfate, and zinc oxide. In embodiments including $TiO_2$, the composition may include, for example, from about 0.1 or about 0.5 or about 5 wt. % to about 5 or about 10 or about 15 wt. % $TiO_2$. In some preferred embodiments, the compositions of the invention comprise a whitening agent or a yellow organic pigment. In some embodiments, the composition comprises from about 0.5 wt. % to about 2.5 wt. % of an organic yellow pigment.

The compositions of the present application may optionally include one or more fillers. Useful fillers are typically solids that are non-reactive with the other components of the compositions of the application. Useful fillers include, for example, crushed quartz, ground or light calcium carbonate (with or without a surface-treatment such as a fatty acid, resin acid, cationic surfactant, or anionic surfactant), magnesium carbonate, sulfates such as barium sulfate, alumina, metals in powder form (e.g., aluminum, zinc and iron), bentonite, kaolin clay, talc, glass particles (e.g., frit or fibers), glass beads, metal oxide particles, silica particles, ceramic microspheres, hollow polymeric microspheres (such as those available under the trade designation EXPANCEL 551 DE from Akzo Nobel, Duluth, Ga.), hollow glass microspheres (such as those available under the trade designation K37 from 3M Company, St Paul, Minn.), carbonates, metal oxides, silicates (e.g. talc, asbestos, clays, mica), sulfates, silicon dioxide and aluminum trihydrate.

The filler can also comprise conductive particles (see, for example, U.S. Patent Application Publication No. 2003/0051807, incorporated herein in its entirety by reference) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal or the like.

The pavement marking includes an adhesive composition or layer that is capable of bonding the tape to a roadway surface. As used herein, the term "adhesive" refers to a composition capable of bonding the pavement marking to the roadway. Some exemplary adhesive compositions include those selected from a group consisting essentially of pressure sensitive adhesives, thermoplastic resin-containing compositions, heat-activated adhesives (i.e., hot melt adhesives), thermoset adhesives, contact adhesives, acrylic adhesives, epoxy adhesives, urethane adhesives, and combinations thereof. Some implementations of these include a wide variety of non-thermoplastic hydrocarbon elastomers including, natural rubber, butyl rubber, synthetic polyisoprene, ethylene-propylene rubber, ethylene-propylene-diene monomer rubber (EPDM), polybutadiene, polyisobutylene, poly(alpha-olefin), styrene-butadiene random copolymer rubber, and acrylate based pressure sensitive adhesive compositions.

Exemplary heat-activated adhesives include those based on linear or radial star thermoplastic elastomers, such as styrene block copolymers (SBC). Exemplary styrene block copolymers include S-I-S(Styrene-isoprene-styrene), S-B-S (Styrene-butadiene-styrene), S-EB-S(Styrene-ethylene/butylene-styrene), S-I-B-S(Styrene-isoprene/butadine-styrene), and the like, combined with various tackifying resins as outlined above. The adhesives are formulated to provide high strength in use, and provide good adhesion to the road when applied using heat. The type and loading of thermoplastic elastomer along with type and loading of tackifying resin can be varied to provide desired attributes. The use of high styrene content SIS resin such as VECTOR 4411 (from Dexco Polymers, Houston Tex.) with rosin ester resin such as WESTREZ 5101P (from Meadwestvaco, Richmond, Va.)

can be formulated to provide an adhesive with good flow at high temperatures yet maintain good strength. The use of lower styrene content SIS polymers, and/or lower tackifying resin loading or softening point can provide formulations with good flow at high temperatures and reduced low temperature modulus that can improve cold weather performance. The use of radial star thermoplastics such as high molecular weight (e.g., >800,000 g/mole) SBC's based on multi-arm star-block copolymer architectures such as those described in U.S. Pat. Nos. 5,296,547 and 5,773,506 (which are incorporated by reference in their entirety herein), can be used to improve high temperature resistance to flow and movement. Adhesives may be prepared using a compounding and coating apparatus for processing natural and synthetic non-thermoplastic elastomer hot melt based PSA described in U.S. Pat. No. 5,539,033 (Bredahl et al.), incorporated herein in its entirety by reference.

The present pavement marking tape may be applied to the substrate by any suitable means, including, for example, extrusion, flame-spraying, and coating on a web followed by application to a roadway.

In some embodiments, pavement markings are heat-moldable to a roadway using for example, an infra-red heater, a flame torch, and/or a tamper cart.

In one aspect, the present application relates to a method of applying a pavement marking tape comprising the steps of: providing a heat-moldable and non-conformable pavement marking tape, wherein the pavement marking tape includes a backing having a thickness of at least 300 microns and comprising an ionic copolymer, and an adhesive layer adjacent to the backing; applying the pavement marking tape to a substrate; and heating the pavement marking tape above the melt point of the non-conformable backing. In another aspect, heat is applied to the substrate prior to the application of the pavement marking tape to the substrate.

In some embodiments, pavement markings are applied to a roadway using a flame-spraying process. In at least some of these embodiments, the composition can be applied using commercially-available flame-spray equipment for pavement marking applications, such as the devices described in U.S. Pat. No. 3,279,336 (Eden et al.), U.S. Pat. No. 3,393,615 (Micheln), and U.S. Pat. No. 3,874,801 (White), incorporated herein by reference.

The pavement marking composition may also be used in a pavement marking tape, wherein the binder and optional filler are cast as a film, as generally described in U.S. Pat. No. 4,117,192 (Jorgensen), U.S. Pat. No. 4,248,932 (Tung, et al), U.S. Pat. No. 5,643,655 (Passarino), and U.S. Pat. No. 5,563,569 (Lasch, et al), all of which are incorporated herein by reference. The top surface of the tape can have protrusions such as disclosed in U.S. Pat. No. 4,388,359 (Ethen, et al), U.S. Pat. No. 4,988,555 (Hedblom), U.S. Pat. No. 5,557,461 (Wyckoff), U.S. Pat. No. 4,969,713 (Wyckoff), U.S. Pat. No. 5,139,590 (Wyckoff), U.S. Pat. No. 5,087,148 (Wyckoff), U.S. Pat. No. 5,108,218 (Wyckoff), and U.S. Pat. No. 4,681,401 (Wyckoff), all of which are incorporated herein by reference.

The pavement marking composition may also be formed into a preformed marking, wherein the binder and filler are mixed, melted, pressed into a film, cooled, and later reheated and applied directly onto the substrate using a torch or other localized heating source, as described in U.S. Pat. No. 4,490,432 (Jordan), incorporated herein by reference. As used herein, the term "preformed pavement marking" means a pavement marking that has been formed into the desired shape or configuration prior to installation. These can be applied directly to the pavement by heating or with an adhesive. One benefit of using a preformed marking is that it requires less equipment and less material for small-area applications. Another advantage is the ability to use smaller equipment which aids in the application of intersection markings and symbols where it is difficult to use hand-liners or truck applicators.

Optical elements may be added to the preformed pavement marking before the material has cooled and hardened, as described in PCT Publication No. 2007/092635 (Nagaoka), incorporated herein by reference in its entirety.

Desired surfaces for preformed pavement marking attachment include, for example, vehicle surfaces for driveways, parking lots, bicycle paths, golf course paths, decks, patios and generally any surface where there may be pedestrian, powered vehicle traffic or building structures. Other examples of potential uses include crosswalks, custom logos, entryways, driveways, parks and horizontal signage, etc. Because these pavement markers are produced in a factory, and not on site, the pavement markers may have higher quality and improved visual appearance. Examples describing preformed markings are in U.S. Pat. No. 8,247,054 (Greer), the disclosure of which is incorporated herein by reference.

Typical roadway surfaces are rough (rather than smooth). As such, good adhesion of the pavement marking to the roadway surface is preferred. The pavement marking tapes of the present disclosure may adapt to and accommodate road surface irregularities.

The pavement marking tapes of the present disclosure have various performance or physical attributes. Each of these physical parameters are measured as described in the examples below.

Advantages and embodiments of this disclosure are further illustrated by the following examples, but the particular materials and amounts thereof recited in these examples, as well as other conditions and details, should not be construed to unduly limit this application. In these examples, all percentages, proportions and ratios are by weight unless otherwise indicated.

EXAMPLES

Test Methods

Conformability: a test strip 1 inch (2.54 cm) wide and 4 inches (10.16 cm) long was tested (i.e., deformed or strained) in a tensile strength apparatus as described in ASTM D638-14, "Standard Test Method for Tensile Properties of Plastics", using a SINTECH model 6365 load frame, a 200 pound (90 kg) MTS load cell, Instron grips and MTS Test Works software (version 4.10A). The sample was strained at a rate of 12 inch/min (30.48 cm/min) until it was strained to 115% of the original sample length (15% strain). The force to deform the sample to 15% strain was recorded and is reported as pounds-force (lbf) and (A). Maximum % strain was recorded and is reported as percentage and (B). The strain at which a resisting force was first observed was noted as initial strain. The pull was reversed from 15% strain at 12 inch/min and the machine returned to its starting point for 30 seconds allowing for complete release of the tensile stress in the sample and elastic recovery. On repeated tensile deformation, no force was observed until the sample was again taut. The strain at which a resisting force was first observed on the second pull (i.e. when the sample again became taut) was recorded as final % strain and is reported as percentage and (C). The final strain divided by the initial strain was calculated and reported as inelastic deformation (ID).

U-Groove Testing: samples 1 in (2.54 cm) wide of pavement marking tape were hand applied to a series of U-groove depressions in a metal panel at a temperature of about 23° C. Each of the U-grooves of the series has a constant radius but has an increasing depth corresponding to 5%, 10%, 15%, 20%, 25% and 30% elongation, so that samples conforming to such grooves presented elongations corresponding to, respectively 5%, 10%, 15%, 20%, 25% and 30%. Comparative tapes were pressed into each U-groove at 23° C. Performance was noted. Exemplary tapes of the present application were heated to 385° F. (196° C.) and allowed to mold to the U-grooves. Performance was noted. Samples were allowed to rest for 72 hrs at 23° C. and performance was noted. Qualitative results are reported.

Materials

| Material/Trade Designation | Description | Supplier |
|---|---|---|
| SURLYN 1702-1 | Ionic copolymer | Dupont |
| Type 3 | Glass Microspheres | Swarco, Columbia, TN |
| Type 1 | Glass Microspheres | Swarco |
| R960 | Titanium dioxide | Dupont, Wilmington, DE |
| VECTOR 4411 | Rubber Elastomer, styrene-isoprene-styrene copolymer | Dexco Polymer, Houston, TX |
| WESTREZ 5101P | Rosin ester tackifying resin | Meadwestvaco, Richmond, VA |

Examples

Comparative Example A

A commercially available pavement marking tape comprising a conformant layer was obtained under the trade designation "3M STAMARK HIGH PERFORMANCE TAPE SERIES 380 IES" from 3M Company, of St. Paul, Minn., and is hereinafter referred to as Comparative Example A.

Comparative Example B

A commercially available pavement marking tape comprising a conformant layer was obtained under the trade designation "3M PRECLEAR REFLECTIVE LICENSE PLATE SHEETING SERIES 4770" from 3M Company, and is hereinafter referred to as Comparative Example B.

Examples 1-3

Examples 1-3 were prepared as follows: pavement marking tapes comprising a backing according to the present application were prepared using a continuous belt process. SURLYN 1702-1 and a white pigment (R960) were fed at 80 wt % and 20 wt % respectively into the first stage of a Twin Screw Extruder (Berstorff Corporation, model "ZE90A", having an L/D of 28) at a maximum wall temperature of about 500° F. The extrudate flowed through a film die onto a high temperature silicone belt, atop on a casting roll heated to approximately about 400° F. The backings were cast at varying thickness, as shown in Table 1, below. Optionally, glass microspheres were then dropped onto the hot backing and a series of infrared heaters heated the backing surface to approximately 475° F. as measured.

An adhesive layer was prepared using a compounding and coating apparatus for processing natural and synthetic non-thermoplastic elastomer hot melt based PSA described in U.S. Pat. No. 5,539,033 (Bredahl et al.), the disclosure of which is incorporated herein by reference in its entirety.

An adhesive layer was prepared by feeding a styrene-isoprene-styrene block copolymer (VECTOR 4411) and a rosin ester tackifying resin (WESTREZ 5101P) into zone 1 of an 89 mm diameter single screw extruder, having a L/D of 36:1 and including conveying and mixing sections. Zone 1 was heated to about 120° C., and zones 2 through 7 were all set at 149° C. The materials were fed at, respectively, a weight ratio of 45 wt %/55 wt %. The adhesive was finally extruded through a die and onto a polypropylene coated paper liner at a thickness of about 20 mil (508 μm).

The backing and liner-backed adhesive were then fed into a nip roll pressurized to 25 psi to effect bonding of the adhesive to the backing. Changing the backing thickness or the adhesive thickness was accomplished by adjusting the respective extrusion rates.

Examples 1-3 are summarized in Table 1, below.

TABLE 1

| Examples | Material | Backing Thickness (microns) | Glass microspheres | Adhesive layer thickness (microns) |
|---|---|---|---|---|
| Example 1 | SURLYN 1702-1 | 610 μm (24 mils) | Type 3 | 508 μm (20 mils) |
| Example 2 | SURLYN 1702-1 | 508 μm (20 mils) | No microspheres | 508 μm (20 mils) |
| Example 3 | SURLYN 1702-1 | 406 μm (16 mils) | Type 1 | 508 μm (20 mils) |

Conformability of Comparative Examples A-B and Examples 1-3 was tested as described above. Results are reported in Table 2, below, wherein (A) is the force to deform the sample to 15% strain; (B) is maximum % strain; (C) is the final % strain; and (ID) is inelastic deformation.

TABLE 2

| Examples | A (lbf) | B (%) | C (%) | ID |
|---|---|---|---|---|
| Comparative Example A | 60.5 | 15 | 4.6 | 30.3 |
| Comparative Example B | 8.3 | 15 | 4.7 | 31.6 |
| Example 1 | 54.7 | 15 | 1.1 | 6.2 |
| Example 2 | 44.7 | 15 | 0.9 | 7.6 |
| Example 3 | 35.8 | 15 | 1.1 | 7.6 |

Comparative Examples A-B and Examples 1-3 were tested in "U" grooves following the above description. Heat moldability is reported qualitative as a function of performance of the samples

TABLE 3

| Sample | Heat moldability to the grooves | Remained tacked to all grooves after 72 hours |
|---|---|---|
| Example 1 | Yes | Yes |
| Example 2 | Yes | Yes |

TABLE 3-continued

| Sample | Heat moldability to the grooves | Remained tacked to all grooves after 72 hours |
|---|---|---|
| Example 3 | Yes | Yes |
| Comparative Example A | Conformed to 15% groove by hand at 23° C., but failed to conform to grooves higher than 15% | Remained tacked to 5% groove but failed grooves higher than 5%. |
| Comparative Example B | Conformed to all grooves up to 25% but failed groove 30% | Remained tacked to all grooves up to 20% |

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

The invention claimed is:

1. A pavement marking tape comprising:
   a backing comprising an ionic copolymer and having a first major surface and an opposite second major surface, the backing having a thickness of at least 300 microns; and
   an adhesive layer adjacent to the second major surface of the backing;
   wherein the pavement marking tape is heat-moldable and non-conformable.

2. The pavement marking tape of claim 1, wherein the pavement marking tape is not extensible to over 115%.

3. The pavement marking tape of claim 1, wherein the backing has a thickness of at least 330 microns.

4. The pavement marking tape of claim 1, wherein the backing has a thickness that is not greater than 600 microns.

5. The pavement marking tape of claim 1, wherein the backing is directly adjacent the adhesive layer.

6. The pavement marking tape of claim 1, further comprising at least one of optical elements and skid-resistant particles.

7. The pavement marking tape of claim 6, wherein the at least one of optical elements and skid-resistant particles are disposed on the first major surface of the backing.

8. The pavement marking tape of claim 6, wherein the optical elements are at least partially embedded into the first major surface of the backing.

9. The pavement marking tape of claim 6, further comprising optical elements distributed throughout the backing.

10. The pavement marking tape of claim 6, wherein the optical elements are selected from the group consisting essentially of glass beads, transparent microspheres, aggregates and bonded core elements.

11. The pavement marking tape of claim 6, wherein the skid-resistant particles are selected from the group consisting of sand, glass frit, aluminum oxide.

12. The pavement marking tape of claim 1, wherein
   the adhesive is selected from a group consisting essentially of pressure sensitive adhesives, thermoplastic resin-containing compositions, hot melt adhesives, thermoset adhesives, contact adhesives, acrylic adhesives, epoxy adhesives, urethane adhesives, non-thermoplastic hydrocarbon elastomers, natural rubber, butyl rubber, synthetic polyisoprene, ethylene-propylene rubber, ethylene-propylene-diene monomer rubber (EPDM), polybutadiene, polyisobutylene, poly(alpha-olefin), styrene-butadiene random copolymer rubber, acrylate based pressure sensitive adhesive compositions, and combinations thereof.

13. The pavement marking tape of claim 1, wherein the backing further comprises a polymer selected from the group consisting of ethylene acrylic acid (EAA) copolymers, ethylene methacrylic acid (EMAA) copolymers, propylene-ethylene copolymers, polypropylene (PP), ethylene-propylene-diene terpolymers (EPDM), polybutylene, ethylene n-butyl acrylate (EnBA), ethylene vinyl acetate (EVA), ethylene ethyl acrylate (EEA) copolymer, ethylene ethyl methyl acrylate (EMA), and blends thereof.

14. The pavement marking tape of claim 1, wherein the total thickness of the pavement marking tape ranges from between about 681 microns to about 1200 microns.

* * * * *